Oct. 9, 1951    J. N. PAQUIN    2,570,477
HOSE COUPLING
Filed March 31, 1948

INVENTOR.
JOSEPH N. PAQUIN
BY
Richey Watts
ATTORNEYS

Patented Oct. 9, 1951

2,570,477

UNITED STATES PATENT OFFICE 2,570,477

HOSE COUPLING

Joseph N. Paquin, Euclid, Ohio, assignor to The Weatherhead Company, Cleveland, Ohio, a corporation of Ohio Application March 31, 1948, Serial No. 18,102

7 Claims. (Cl. 285—84)

This invention relates to hose ends, that is, to fittings adapted to be mounted on the ends of flexible hoses to connect the hoses into a fluid circuit. One application of the invention is to hoses in hydraulic brake systems, and it is so illustrated herein, but the invention is obviously capable of use generally in fluid systems.

General objects of the invention are to retain the hose tightly, to prevent leakage, to improve the durability and reliability of hose ends, and to promote economical fabrication and assembly onto the hose by mass production methods.

A more specific object of the invention is to improve hose ends in which the body of the hose end is formed for the application of a wrench to hold the body against rotation while it is being coupled to another fitting.

A further object of the invention is to provide an improved sleeve for a hose end which is adapted for the application of a wrench and which may be formed from sheet metal.

A still further object of the invention is to eliminate loosening of the grip of the hose end on the hose caused by flow of the hose into the portion of the hose end conformed for the application of a wrench.

The manner in which these objects, as well as other objects and advantages of the invention more or less ancillary in nature, are realized, will be apparent to those skilled in the art from the description herein of the preferred embodiment of the invention.

Referring to the drawings, which illustrate the preferred embodiment of the present invention applied to one type of fitting:

Figure 1:
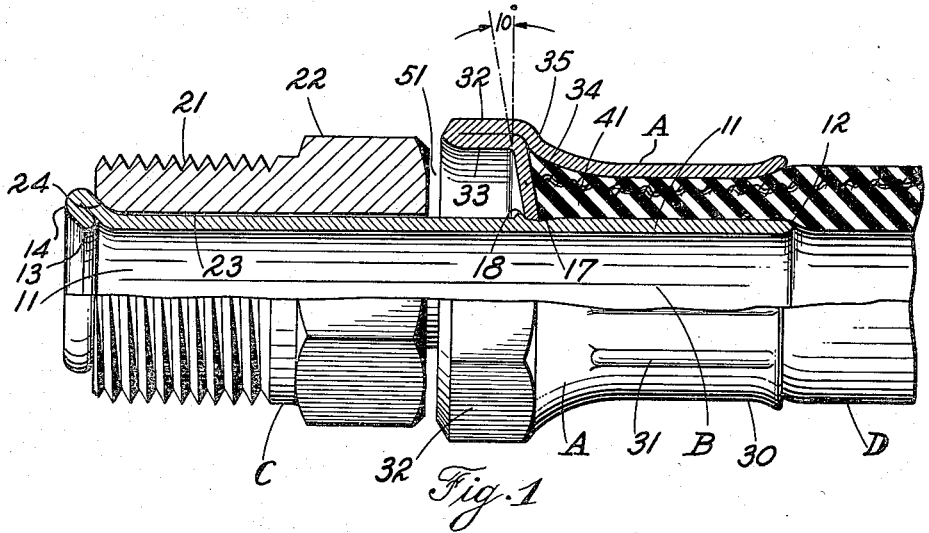
Fig. 1 is a longitudinal view, partly in section, of a fitting assembled on a hose.

The hose end comprises three parts, a sleeve A and a tube B which together comprise the body of the hose end, and a nut C rotatable on the body; and is adapted for mounting on the end of a resilient hose D which may be of any standard composition. The tube B on which the other parts of the hose end are mounted comprises a straight length 11 of tubing, one end of which is adapted to enter the hose D, the extreme portion of this end being preferably slightly tapered as indicated at 12 to facilitate the insertion into the hose and avoid abrasion of the hose by a sharp end of the tube. The opposite end of the tube is formed for engagement with a male conical seat (not shown), the tube being doubled back as indicated at 13 and flared outwardly at approximately a 45° angle to form a head 14 of double thickness, the inner surface forming a concave conical seat. The nut C, which is freely rotatable on the tube B, comprises a threaded portion 21 and a preferably hexagonal portion 22 for the application of a wrench. The leading edge of the central bore 23 of the nut is chamfered at 24 to conform to the outer surface of the flared end 14 of the tube. The form of the end 14 of the tube and the nut C here illustrated are adapted for coupling to a fitting formed with a mating female thread and a male conical seat. It will be apparent, however, that these parts may be modified to adapt them for engagement with companion fittings of other forms, within the scope of the invention herein claimed.

Figures 2, 3:
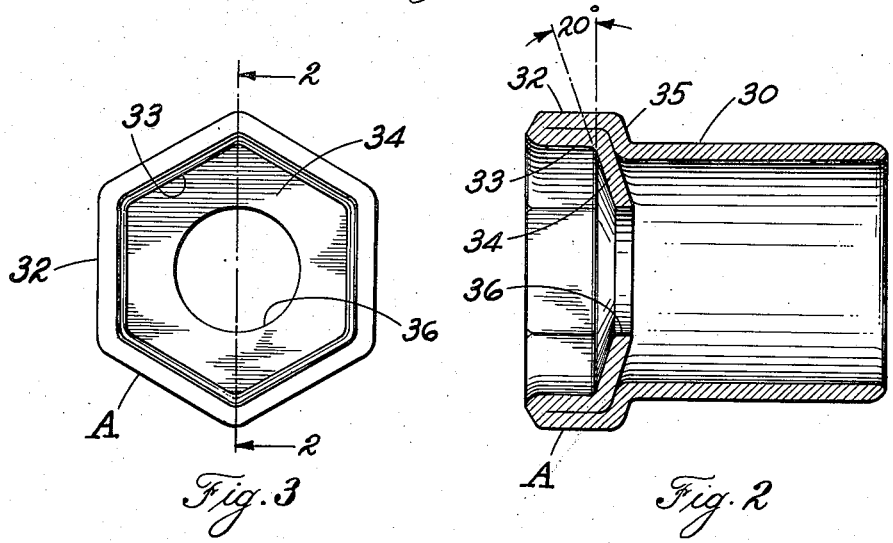
Fig. 2 is a longitudinal section of the sleeve portion of the hose end before assembly.
Fig. 3 is an elevation view of the same as viewed from the left in Fig. 1.

The end 41 of the hose which fits over the tube 11 is retained in fluid-tight and tension-resisting engagement with the tube by the sleeve A which comprises a generally cylindrical portion 30 which is compressed into tight engagement with the hose, preferably by crimping, as indicated by the ribs 31 on the portion 30 of the sleeve. The preferred form of the sleeve A before assembly onto the tube B and crimping into engagement with the hose D is illustrated in Figs. 2 and 3. It comprises the cylindrical portion 30, the inner diameter of which is slightly greater than the outside diameter of the hose, a polygonal, preferably hexagonal portion 32 of greater diameter than the cylinder 30, a portion 33 folded back into the hexagonal portion 32, and a conical inwardly directed flange 34 abutting the portion 35 of the body intermediate the cylinder 30 and the hexagonal portion 32. The flange 34 preferably is inclined at an angle of approximately 20° to the normal to the axis of the sleeve and is formed with a central opening 36 dimensioned for a light press fit over the tube 11.

An important feature of the invention lies in making the sleeve A from sheet metal in preference to making the body of the fitting by machining as is the customary method. According to this invention, the body of the fitting is made of inexpensive materials, tubing and sheet metal, which are formed and assembled to make the body of the fitting, the only part requiring machining operations being the nut C, which must be threaded.

Any appropriate method may be used for forming the sleeve A from sheet metal. A disk may be drawn into a cup, thus forming the cylindrical portion 30. The bottom of the cup may then be pushed in to provide the double thickness at 32, 33 and then expanded to provide the hexagonal outline. The bottom of the cup is dished at an angle of 20° to form the flange 34 which is provided with the straight central opening 36, preferably by drilling. This is the preferred sequence of operations.

After the fabrication of the parts thereof, the fitting is assembled in the following manner: The nut C and sleeve A are slipped on to the tube B and the flange 34 is flattened to grip the tube B in a manner similar to that described in an application for "Hose End" of John D. Baldwin, Jr., and Charles H. Crawley, Serial No. 13,425, filed March 6, 1948. Preferably, the left-hand face of the nut C as illustrated in Fig. 1 rests against a backing member, and the adjacent end of the tube B rests within a recess in the backing member so as to provide a clearance between the surface 24 of the nut and the flange of the tube. With the leading edge 37 of the sleeve resting against the face of the nut, an annular punch is inserted between the tube and the sleeve as described in the abovementioned application. The face of this punch is concave at an angle of approximately 10° to a plane perpendicular to the axis of the tube. By striking or driving the punch, the flange 34 is driven to the left in Fig. 1 and flattened out to an angle of about 80° to the axis of the fitting. By this flattening operation, the diameter of the opening 36 is decreased, the inner edge of the opening 36 is preferably caused to bite into the tube 11, and the flange 34 tightly grips the tube 11. When the flange 34 bites into the tube 11 it forms a groove 17 and a ridge 18, the flange being seated in the groove and abutting the ridge. This simple operation completes the assembly of the fitting. A slight clearance as indicated at 51 is preferably maintained between the sleeve and nut so that the latter may turn freely with respect to the body of the fitting.

To assemble the fitting on a hose, the hose is inserted between the tube 11 and sleeve portion 30 into engagement with the flange 34, and the sleeve is reduced in diameter to compress the hose between the sleeve and tube. This is preferably accomplished by a crimping operation, which may be performed by machines of a known type such as that described in Patent No. 2,211,622 to Hunziker.

While the angles specified for the flange 34 before and after assembly have been found to be desirable for an actual fitting for a brake hose in which the hexagonal portion 32 is approximately $\frac{7}{8}$ of an inch across the flats, the initial clearance between the tube 11 and the hole 36 is not more than about .005 of an inch, and the remaining dimensions are in the proportions shown in the drawings, it will be apparent that these angles may be varied for different fittings so that the flattening of the flange 34 produces the desired gripping force between the flange and the tube 11. Preferably this gripping force exceeds the resistance to bending of the flange 34, so that any force tending to pull the sleeve A off the tube B acts to increase the grip so that the parts are permanently locked together. An important feature of the present invention is that it provides the enlarged hexagonal portion 32 for the application of a wrench to the body of the fitting, but, nevertheless, avoids any pocket within this enlarged portion into which the hose might cold flow. The re-entrant arrangement of the sleeve portions 33 and 34 closes off the hexagonal portion to the hose. If the flange 34 were at the outer or left-hand end of the hexagonal portion 32, the inner end of the hose would not be confined and the hose could flow from within the sleeve portion 31, where it is compressed, into the hexagon with a result of loss of compression and tightness.

The invention thus provides for confinement of the hose against cold flow and at the same time results in a strong hexagonal section 32 for the wrench. It extends the highly successful fabrication method of the abovementioned Baldwin et al. application to a new field of usefulness.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

I claim:

1. A hose-end comprising a tubular member, a unitary sleeve formed from sheet metal and comprising a first portion adapted to receive a hose, a second portion extending axially of the sleeve from the first portion and of greater diameter, and an inwardly-directed portion intermediate the first two portions and closing the end of the first portion, the inwardly-directed portion being fixed to the tubular member.

2. A hose-end comprising a tubular member and a formed cup comprising an infolded portion, the inner layer of the infolded portion terminating in an inwardly-directed flange adapted to engage the tubular member, and the outer layer being continued to form a sleeve, the tubular member, sleeve, and flange defining an annular recess for reception of the hose.

3. A hose-end comprising a tubular member and a formed cup comprising an infolded portion, the inner layer of the infolded portion terminating in an inwardly-directed flange adapted to engage the tubular member, and the outer layer being continued to form a sleeve of smaller diameter than the infolded portion, the tubular member, sleeve, and flange defining an annular recess for reception of the hose.

4. A hose-end comprising a tubular member and a formed cup comprising an infolded polyhedral portion, the inner layer of the infolded portion comprising and terminating in an inwardly-directed flange adapted to engage the tubular member, and the outer layer being continued to form a substantially cylindrical sleeve, the tubular member, sleeve, and flange defining an annular recess for reception of the hose.

5. A hose-end comprising a tubular member adapted for insertion within a hose and a sleeve about the member adapted to compressively engage the member and the hose, the sleeve comprising a hose-receiving portion and a non-circular portion for application of a wrench, the material of the non-circular portion being doubled back to provide two layers, and a conical flange directed inwardly from the inner layer at the end of the circular portion, the said flange providing a stop for the hose to contain the hose within the hose-receiving portion.

6. A hose end comprising a tubular nipple member, a hose-receiving member comprising a formed polygonal cup comprising an infolded portion, the inner layer of the infolded portion terminating in an inwardly-directed flange adapted to engage the tubular member, and the outer layer being continued to form a sleeve, the tubular member, sleeve, and flange defining an annular recess for reception of the hose, and a coupling member rotatably and slidably mounted on said nipple member, said coupling member having a polygonal portion that fits within said cup.

7. A hose end comprising a tubular nipple member and a hose-receiving member, said member being of sheet metal and comprising a formed cup having an outer portion and an infolded portion, the infolded portion of said cup terminating in an inwardly-directed flange adapted to engage the tubular member, and the outer portion of said cup being continued to form a hose-receiving sleeve, the tubular member, sleeve, and flange defining an annular recess for reception of the hose, said cup portions being contiguous and polygonal in section to form a double thickness wrench-receiving portion.

JOSEPH N. PAQUIN.

REFERENCES CITED

The following references are of record in the file of this patent:

UNITED STATES PATENTS

| Number | Name | Date |
|---|---|---|
| 1,181,280 | Winter | May 2, 1916 |
| 1,484,295 | Bundy | Feb. 19, 1924 |
| 1,954,989 | Eastman | Apr. 17, 1934 |
| 2,034,644 | Walsh | Mar. 17, 1936 |
| 2,165,323 | White | July 11, 1939 |
| 2,314,001 | Lusher et al. | Mar. 16, 1943 |
| 2,432,598 | Weatherhead | Dec. 16, 1947 |